US009775111B2

(12) United States Patent  
Rabii et al.

(10) Patent No.: US 9,775,111 B2
(45) Date of Patent: Sep. 26, 2017

(54) POWER MANAGEMENT IN DEVICE TO DEVICE COMMUNICATIONS

(71) Applicant: QUALCOMM Incorporated, San Diego, CA (US)

(72) Inventors: Khosro Mohammad Rabii, San Diego, CA (US); Vijay Naicker Subramaniam, San Diego, CA (US); Shivakumar Balasubramanyam, San Diego, CA (US); Fawad Shaukat, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 14/497,604

(22) Filed: Sep. 26, 2014

(65) Prior Publication Data

US 2016/0095062 A1  Mar. 31, 2016

(51) Int. Cl.
*H04W 52/02* (2009.01)
*H04W 76/04* (2009.01)
*H04W 84/18* (2009.01)

(52) U.S. Cl.
CPC ... *H04W 52/0229* (2013.01); *H04W 52/0235* (2013.01); *H04W 52/0251* (2013.01); *H04W 52/0274* (2013.01); *H04W 76/048* (2013.01); *H04W 84/18* (2013.01); *Y02B 60/50* (2013.01)

(58) Field of Classification Search
CPC ............ H04W 52/0229; H04W 52/0274
See application file for complete search history.

(56) References Cited

U.S. PATENT DOCUMENTS

| | | | |
|---|---|---|---|
| 2009/0017857 A1* | 1/2009 | Kwon | H04W 76/046 455/519 |
| 2010/0008279 A1 | 1/2010 | Jeon et al. | |
| 2010/0128624 A1 | 5/2010 | Lee et al. | |
| 2011/0185200 A1 | 7/2011 | Sim et al. | |
| 2012/0178368 A1 | 7/2012 | Fleck et al. | |

(Continued)

FOREIGN PATENT DOCUMENTS

WO   2013080080 A1   6/2013

OTHER PUBLICATIONS

"IEEE P802.11s(IM)/D2.02 Draft Standard for Information Technology Telecommunications and information exchange between systems Local and metropolitan area networks Specific requirements, Part 11: Wireless LAN Medium Access Control (MAC) and Physical Layer (PHY) specifications, Amendment 10: MeshNe", IEEE Draft; Draft P802.11S D2.02, IEEE-SA, Piscataway, NJ USA,—vol. 802.11s, No. D2.02, Sep. 9, 2008 (Sep. 9, 2008), pp. 1-259, XP017646856, [retrieved on Sep. 9, 2008] p. 75, line 43—p. 89, line 15.

(Continued)

*Primary Examiner* — Charles C Jiang
*Assistant Examiner* — Thad Defauw
(74) *Attorney, Agent, or Firm* — MG-IP Law, P.C.

(57)   ABSTRACT

Systems, methods and apparatus for remotely controlling the power management of a mobile device are provided. The system, method, and apparatus may include a mobile terminal wirelessly connected to a sensor platform. The sensor platform may send a constant awake message to the mobile terminal that prevents the mobile terminal from entering a sleep mode until the sensor platform sends a release signal to the mobile terminal.

38 Claims, 8 Drawing Sheets

(56) References Cited

U.S. PATENT DOCUMENTS

| | | | | |
|---|---|---|---|---|
| 2012/0287835 | A1* | 11/2012 | Jeon | H04W 52/287 370/311 |
| 2012/0297229 | A1 | 11/2012 | Desai et al. | |
| 2013/0204962 | A1 | 8/2013 | Estevez et al. | |
| 2013/0321288 | A1* | 12/2013 | Adamson | G06F 3/041 345/173 |
| 2014/0278186 | A1* | 9/2014 | Herzl | G01N 33/0006 702/104 |
| 2015/0185292 | A1* | 7/2015 | Doi | G01R 31/3606 340/870.02 |

OTHER PUBLICATIONS

International Search Report and Written Opinion—PCT/US2015/045096—ISA/EPO—Oct. 23, 2015.

Research in Motion Limited: "Explicit DRX control", 3GPP Draft; R2-071261, 3rd Generation Partnership Project (3GPP), Mobile Competence Centre ; 650, Route Des Lucioles ; F-06921 Sophia-Antipolis Cedex ; France, vol. RAN WG2, No. St. Julian; Mar. 22, 2007, Mar. 22, 2007 (Mar. 22, 2007), XP05134219.

Agrawal P., et al., "OPSM—Opp.ortunistic Power Save Mode for Infrastructure IEEE 802.11 WLAN," IEEE, Centre for Electronics Design and Technology, 2010, pp. 1-6.

Camps-Mur D., et al., "Designing Energy Efficient Access Points with Wi-Fi Direct," NEC Network Laboratories, May 17, 2011, pp. 1-18.

Gabrielsen E.B., "An API to Wi-Fi Direct Using Reactive Building Blocks," Master of Telematics—Communication Networks and Networked, Jun. 2012, pp. 1-97.

Ganesan D., et al., "Complex Behavior at Scale: An Experimental Study of Low-Power Wireless Sensor Networks," Technical Report UCLA/CSD-TR, vol. 13, 2002, pp. 1-11.

Lin S., et al., "ATPC: Adaptive Transmission Power Control for Wireless Sensor Networks," In Proceedings of the 4th International Conference on Embedded Networked Sensor Systems, 2006, pp. 1-14.

Ma H., et al., "Energy Conservation in 802.11 WLAN for Mobile Video Calls," IEEE International Symposium on Multimedia, Dec. 10-12, 2012, pp. 1-8.

Simunic T., et al., "Event-Driven Power Management of Portable Systems," Proceedings of 12th International Symposium on System Synthesis, Nov. 10-12, 1999, pp. 1-6.

Smith P., "Comparing Low-Power Wireless Technologies," Whitepaper, May 2011, pp. 1-11.

Srinivasan K., et al., "Some Implications of Low Power Wireless to IP Networking," In Proceedings of the 5th Workshop on Hot Topics in Networks, Nov. 2006, pp. 1-6.

Tseng Y-C., et al., "Power-Saving Protocols for IEEE 802.11-Based Multi-Hop Ad Hoc Networks," In Proceedings of the 21st Annual Joint Conference of the IEEE Computer and Communications Societies, 2002, pp. 1-10.

Wattenhofer R., et al., "Distributed Topology Control for Power Efficient Operation in Multihop Wireless Ad Hoc Networks," IEEE Proceedings of 20th Annual Joint Conference of the IEEE Computer and Communications Societies, Apr. 22-26, 2001, pp. 1-10.

Zheng R., et al., "On-Demand Power Management for Ad Hoc Networks," In Proceedings of IEEE, Infocom, 2003, pp. 1-11.

Zheng R., et al., "Power Management and Power Control in Wireless Networks," Ad Hoc and Sensor Networks, Nova Science, 2004, pp. 1-25.

Zhong L., et al., "Power Consumption by Wireless Communication," ELEC518, Spring 2011, pp. 1-64.

\* cited by examiner

POWER MANAGEMENT IN DEVICE TO DEVICE COMMUNICATIONS

FIELD OF DISCLOSURE

This disclosure relates generally to power management, and more specifically, but not exclusively, to remote power management of a wireless device.

BACKGROUND

A conventional WiFi-Dock wirelessly transfers data between the dock and a mobile device such as a host. The WiFi-Dock may be equipped with a sensor platform capable of measuring many Use-Environment and User contexts to identify Nearness/Presence (User-Proximity), Touch and Pressure, Fingerprint, Vision, Heading, Kinetics, etc. The WiFi-Dock sensor data should be processed by a smart multimedia component locally or in the Host to integrate the WiFi-Dock into a Host HLOS Application processing environment. Tracking sensor operation for calibration to identify ground-truth and synchronizing different sensor outputs to ensure reliable operation requires a datapath between the WiFi-Dock and smart multimedia component. When the multimedia component is in the Host, the Host connection to the Dock is not always ON. While sensor data is being transferred to the multimedia component, control messages and configuration data are regularly delivered to the WiFi-Dock to calibrate/baseline its sensor to ensure reliable operation. If the multimedia component is in the Host, the transmission of data occurs when the Host is ON and must be stored or cached if the Host is not ON when the data is ready to transfer. This constant transfer of data requires the power-manager in the WiFi-Dock and the Host to avoid disrupting the datapath to the Host as much as possible. Although the WiFi-Dock can be wall-plugged or wirelessly charged, the mobile device Host connected to the WiFi-Dock will still be expected to operate regularly with a battery and its battery life will be a critical performance attribute. Optimizing WiFi power requires SLEEP and causes disruption of the AP/GO and station communication, which adds latency in the datapath between the WiFi-Dock sensor platform and Host. For example, if sensor data is detected in the Dock but the Host is not ON, the sensor data must be stored until the Host is ON and ready to receive the data. This adds latency from the time the Dock detects the sensor data and the time the multimedia component in the Host receives and processes the data.

Accordingly, there are long-felt industry needs for methods that improve upon conventional methods including the improved methods and apparatus provided hereby.

The inventive features that are characteristic of the teachings, together with further objects and advantages, are better understood from the detailed description and the accompanying figures. Each of the figures is provided for the purpose of illustration and description only, and does not limit the present teachings.

SUMMARY

The following presents a simplified summary relating to one or more aspects and/or embodiments associated with the apparatus and methods disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the apparatus and methods disclosed herein in a simplified form to precede the detailed description presented below.

Some exemplary embodiments of the disclosure are directed to systems, apparatus, and methods for power management in device to device communications.

In some embodiments of the disclosure, the system, apparatus, and method may include an override power-manager in the AP/GO that allows a WiFi-Dock to control a mobile device Host to receive and process raw-data of the Dock sensors with minimum latency (such as high BW data from the in-cell capacitive-touch integrated in the WiFi-Dock display; raw fingerprint data because of security concerns; and streaming video from an image-sensor in the WiFi-Dock, etc.).

Some embodiments may include requesting that the Host power-manager operate in constant awake mode-only (CAM-ONLY) mode: Sensor-Platform-Manager requests Host to operate in constant awake mode (CAM); during next target beacon transmit time (TBTT), WiFi-Dock sends Host a listen request (LISTEN-REQ); Host acknowledged listen request (ACKs LISTEN-REQ); Host configures its power-manager to only function in CAM; and Host sets CAM-ONLY flag in future beacon messages.

Some embodiments may include requesting Host power-manager to resume power saving mode (PSM) operation: Sensor-Platform-Manager cancels requests for Host to operate in CAM; WiFi-Dock sends Host a listen release (LISTEN-REL); Host acknowledges the listen release (ACKs LISTEN-REL); Host sets PSM flag in next beacon messages; and at next TBTT, Host configures its power-manager for PSM operation.

Other objects and advantages associated with the apparatus and methods disclosed herein will be apparent to those skilled in the art based on the accompanying drawings and detailed description.

BRIEF DESCRIPTION OF THE DRAWINGS

The accompanying drawings are presented to describe examples of the present teachings, and are not limiting. The accompanying drawings are presented to aid in the description of embodiments of the disclosure and are provided solely for illustration of the embodiments and not limitation thereof.

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
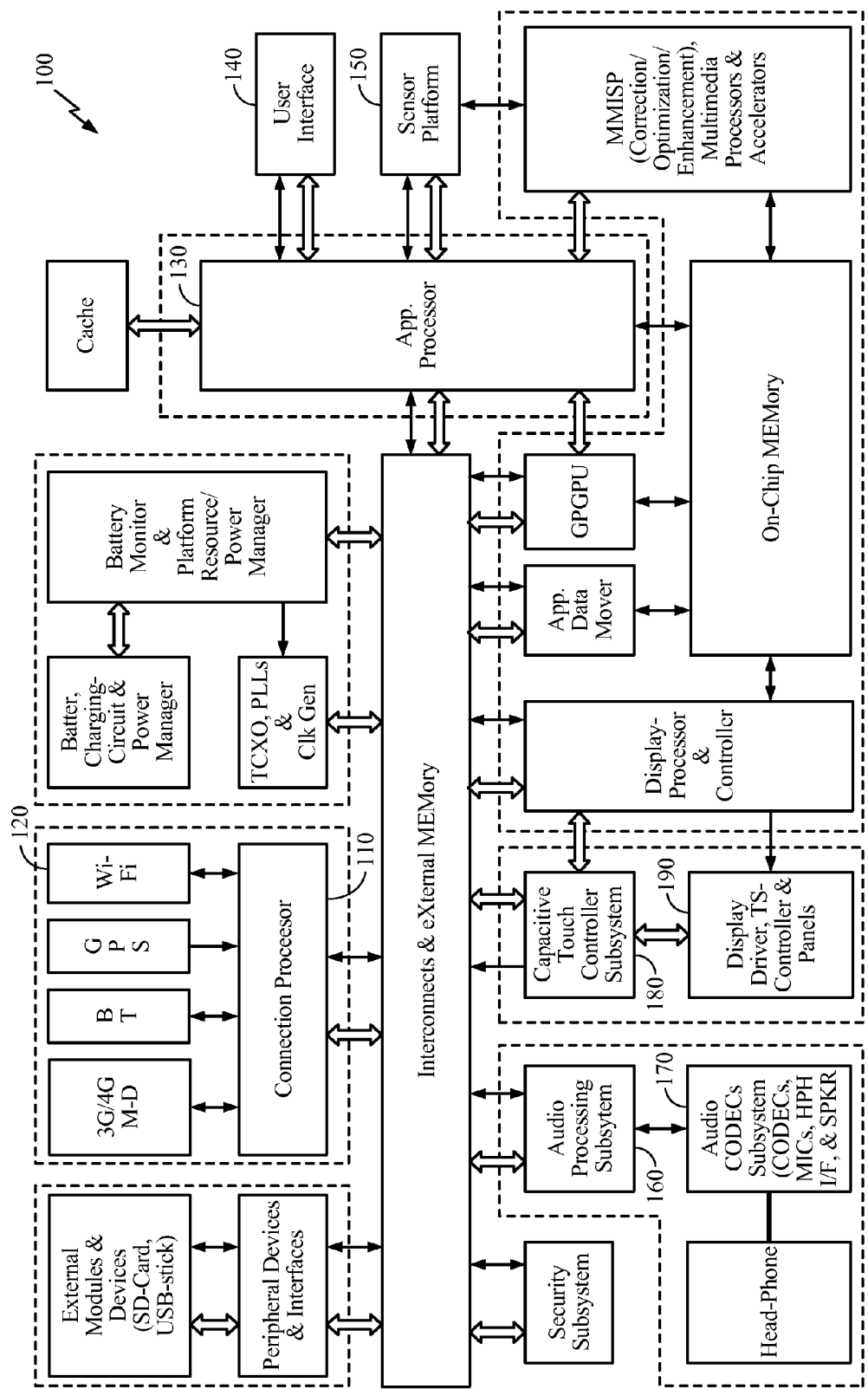
FIG. 1 depicts an exemplary block diagram of a mobile terminal.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Methods, apparatus and systems for are provided. The exemplary methods, apparatus, and systems disclosed herein advantageously address the long-felt industry needs, as well as other previously unidentified needs, and mitigate shortcomings of the conventional methods, apparatus, and systems. For example, an advantage provided by the disclosed methods, apparatus, and systems herein is an improvement in.

Various aspects are disclosed in the following description and related drawings to show specific examples relating to exemplary embodiments of the disclosure. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element. Coupling and/or connection between the elements can be physical, logical, or a combination thereof. As employed herein, elements can be "connected" or "coupled" together, for example, by using one or more wires, cables, and/or printed electrical connections, as well as by using electromagnetic energy. The electromagnetic energy can have wavelengths in the radio frequency region, the microwave region and/or the optical (both visible and invisible) region. These are several non-limiting and non-exhaustive examples.

It should be understood that the term "signal" can include any signal such as a data signal, audio signal, video signal, multimedia signal, analog signal, and/or digital signal. Information and signals can be represented using any of a variety of different technologies and techniques. For example, data, an instruction, a process step, a command, information, a signal, a bit, and/or a symbol described in this description can be represented by a voltage, a current, an electromagnetic wave, a magnetic field and/or particle, an optical field and/or particle, and any combination thereof.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements. In addition, terminology of the form "at least one of: A, B, or C" used in the description or the claims can be interpreted as "A or B or C or any combination of these elements."

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

In this description, certain terminology is used to describe certain features. The term "mobile device" can describe, and is not limited to, a mobile phone, a mobile communication device, a pager, a personal digital assistant, a personal information manager, a mobile hand-held computer, a laptop computer, a wireless device, a wireless modem, and/or other types of portable electronic devices typically carried by a person and/or having communication capabilities (e.g., wireless, cellular, infrared, short-range radio, etc.). Further, the terms "user equipment" (UE), "mobile terminal," "mobile device," and "wireless device," can be interchangeable.

FIG. 1 depicts an exemplary block diagram of a mobile terminal according to some embodiments of the disclosure. As shown in FIG. 1, the mobile terminal 100 may include a connection processor 110 connected to a WiFi component 120, an application processor 130 connected to a user interface component 140 and a sensor platform 150, an audio processing component 160 connected to an audio codec component 170, and a capacitive touch controller 180 connected to a display driver component 190.

Figure 2:
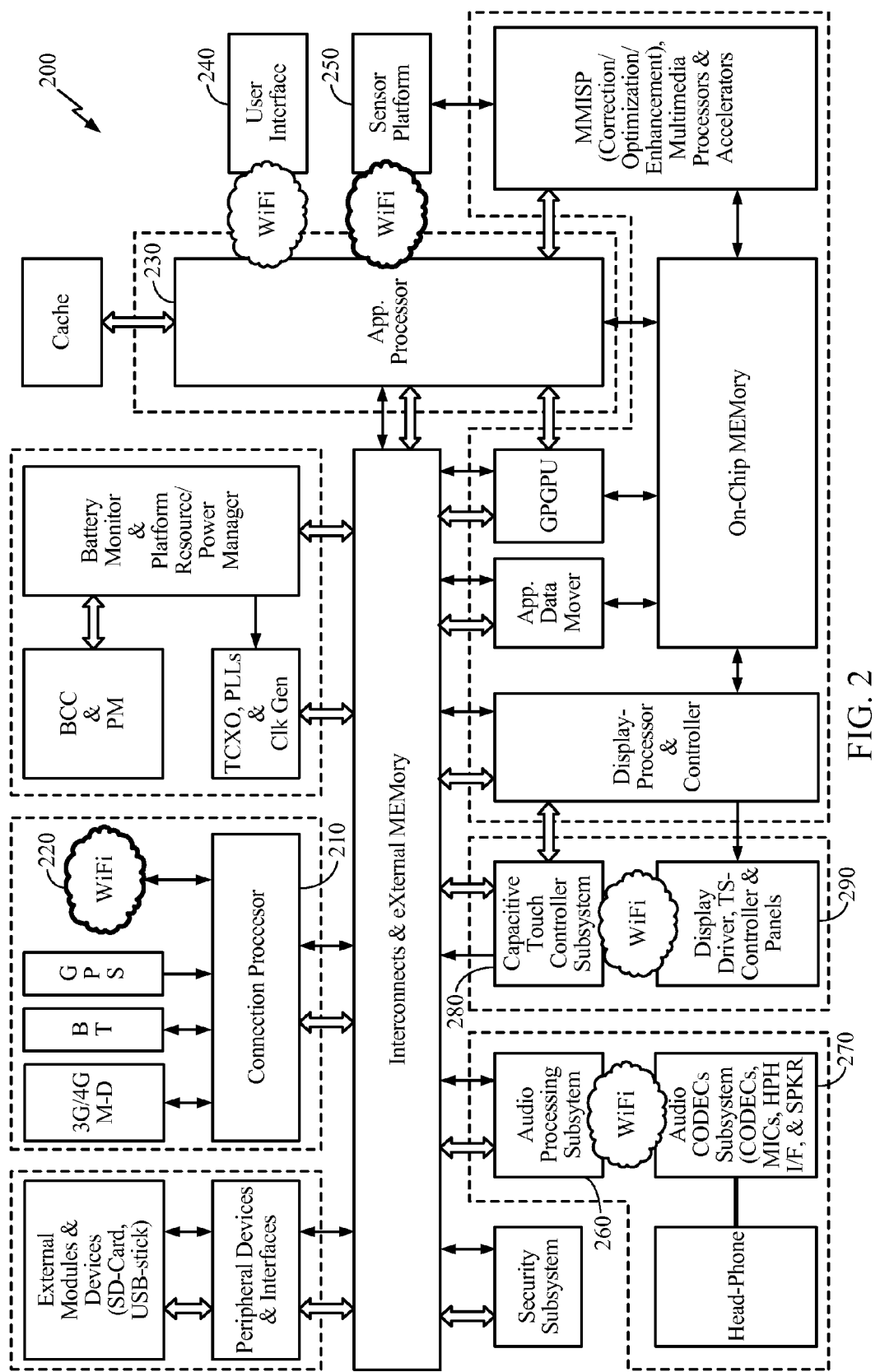
FIG. 2 depicts another exemplary block diagram of a mobile terminal.

FIG. 2 depicts an exemplary block diagram of a mobile terminal according to some embodiments of the disclosure. As shown in FIG. 2, the mobile terminal 200 may be wirelessly connected to a WiFi-dock (not shown) for remote sensing operations. The mobile terminal 200 may include a connection processor 210 connected to a WiFi component 220 for handling the wifi connection between the mobile terminal and the dock, an application processor 230 connected to a user interface component 240 and a sensor platform 250, an audio processing component 260 connected to an audio codec component 270, and a capacitive touch controller 280 connected to a display driver component 290. The user interface component 240 and sensor platform 250 may be integrated into the mobile terminal 200 or may be stand alone or part of the dock with a wifi connection or data path between the component/platform and the application processor 230.

Figure 3:
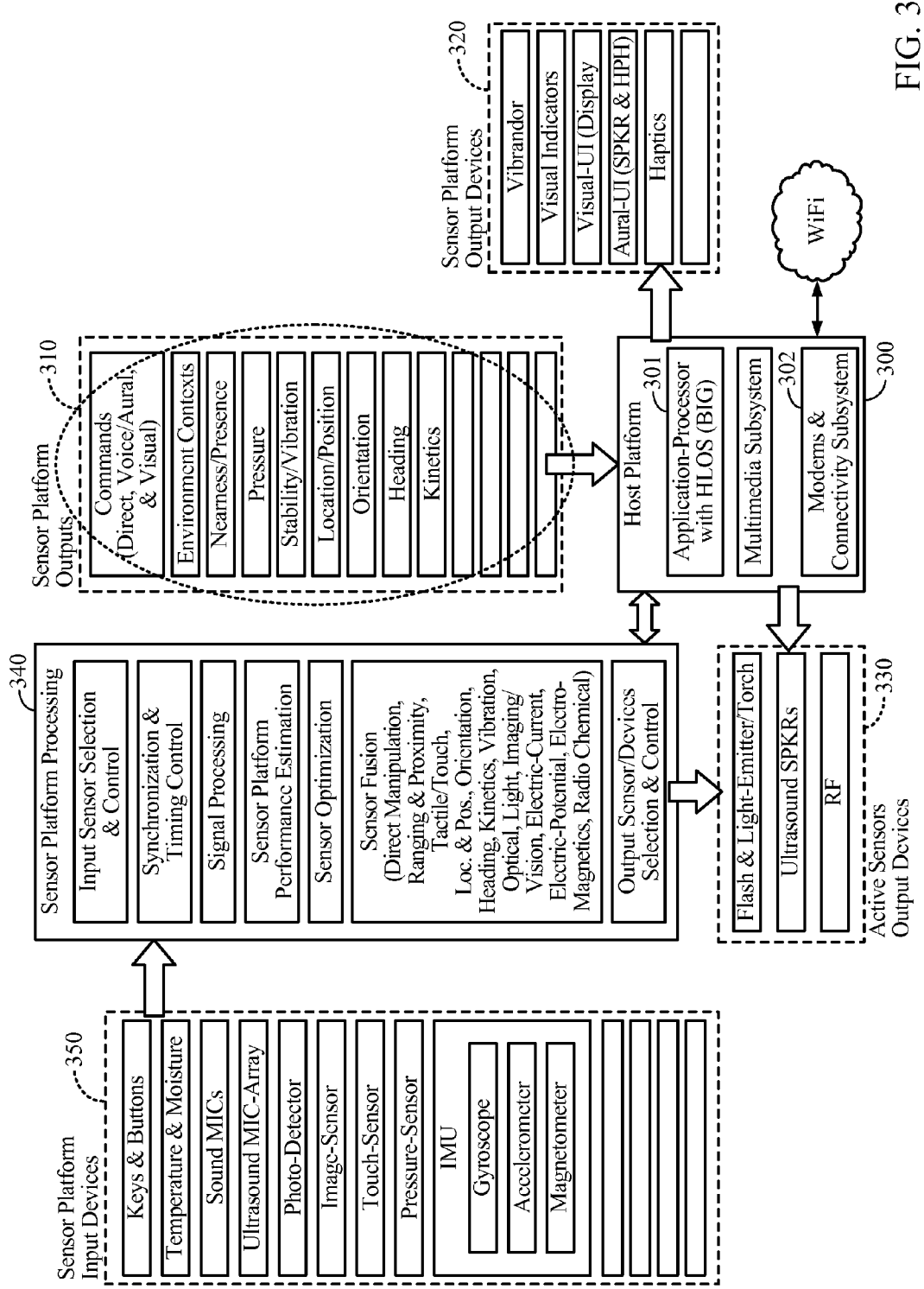
FIG. 3 depicts an exemplary block diagram of a sensor and a host platform.

FIG. 3 depicts an exemplary block diagram of various components and platforms in a sensor platform and host platform. As shown in FIG. 3, a host platform 300 may include a host application processor 301 and connectivity components 302 to enable wifi connectivity. The host platform 300 may be connected to sensor components such as a sensor platform 310, sensor platform output devices 320, active sensor output devices 330, sensor platform processing components 340, and sensor platform input devices 350. The sensor components may be integrated into the host platform 300, a docking station, another mobile terminal, or a combination of these locations including duplication in all three locations.

Figure 4:
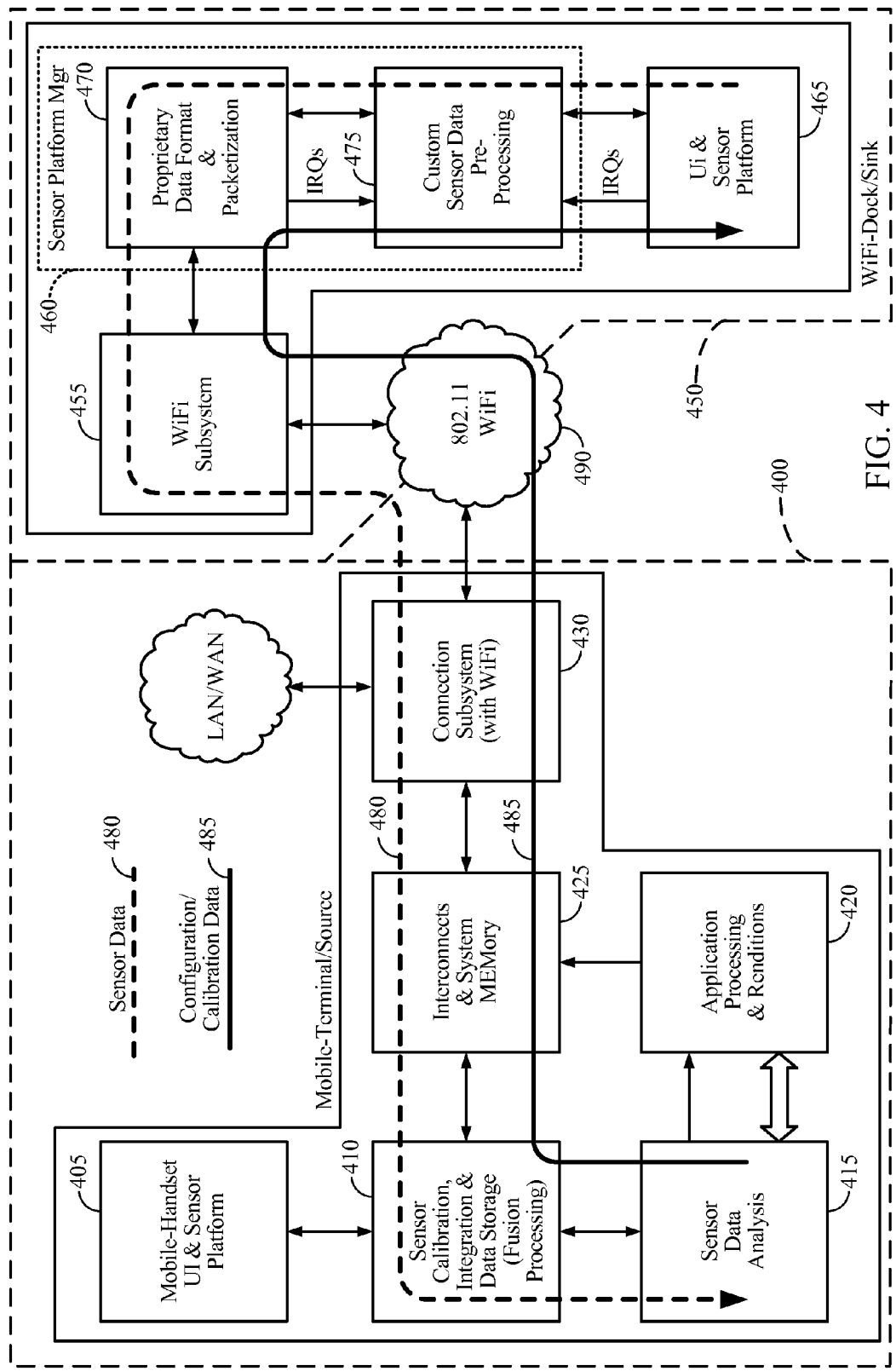
FIG. 4 depicts an exemplary block diagram of a docking station and a mobile terminal.

FIG. 4 depicts an exemplary combination of a mobile terminal acting as a source and a docking station with an integrated sensor platform acting as a sink. As shown in FIG. 4, a mobile terminal 400 may include a mobile handset user interface (UI) 405, a sensor calibration, integration and data storage component 410, a sensor data analysis component 415, an application processing component 420, an interconnection and system memory component 425, and a connection component with wifi capabilities 430. FIG. 4 also shows a docking station 450 that may include a wifi component 455, a sensor platform manager component 460, and a UI and sensor platform component 465. The sensor platform manager 460 may include a data format and packetization component 470 and a sensor data pre-processing component 475.

As can be seen in FIG. 4, the mobile terminal 400 may be connected to the docking station 450 to exchange sensor data 480 and configuration/calibration data 485. This connection may be a wireless connection such as 802.11 WiFi 490. The connection 490 allows sensor platform 465 to send sensor data 480 over the connection 490 to the sensor data analysis component 415. In addition, the connection 490 allows the sensor data analysis component 415 to send configuration/calibration data 485 over the connection 490 to the sensor platform 465.

Sensor performance may be improved by tracking and analyzing the sensor data to calibrate its operation and enhance its performance reliability. This may require sampling and tracking of sensor data. By performing this operation in a mobile terminal as opposed to a docking station or standalone sensor platform, allows the docking station or standalone sensor platform to be less complex because the processing functions are offloaded to a device that already includes this capability. Sampling and tracking may be event-based where the recognizer studies many events to accurately determine the ground truth for example. However, event based evaluation is principally unreliable because often asynchronous events do not necessarily present identical ground-truth that results in similar recognizer output. Sampling and tracking may be periodic where sensor platform outputs are regularly measured (and compared to ground-truth) at corresponding time frames for example. However, periodic analysis of sensor platform data is unnecessary and inefficient. Sampling and tracking may be event-based and periodic where recurrence of event is learned to determine measurement rate for example. The reliability of this sampling strategy depends on long term analysis of many events and individual event timings should be less significant or dismissed altogether.

Figure 5:
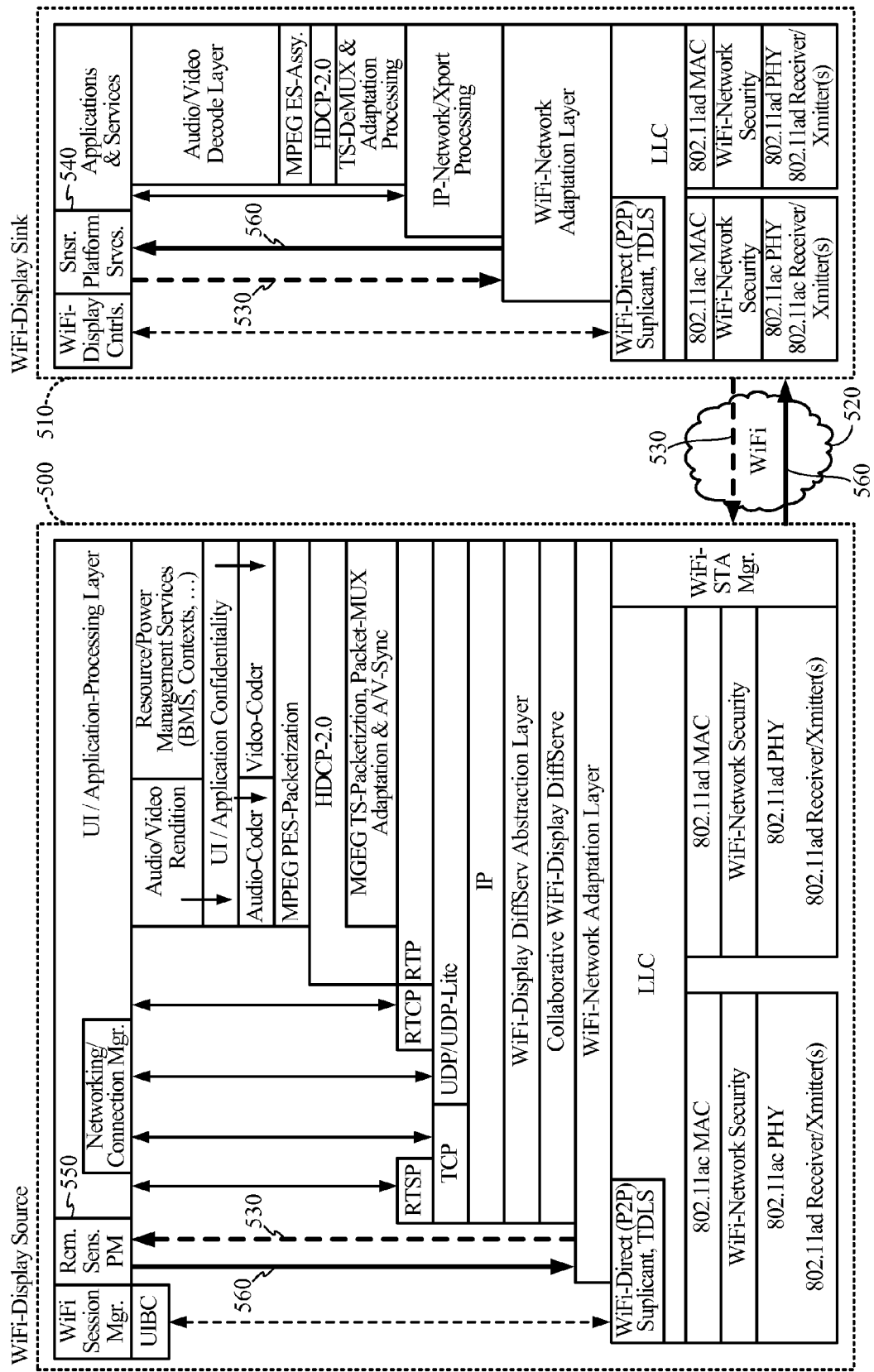
FIG. 5 depicts an exemplary block diagram of a display source and sink.

FIG. 5 depicts a display source and sink. As shown in FIG. 5, a display source 500 may be connected to a display sink 510 through a WiFi connection 520. The WiFi connection 520 allows sink 510 to send sensor data 530 from a sensor platform services component 540 of sink 510 to a remote sensor platform manager component 550 and for the remote sensor platform manager component 550 to send configuration and calibration data 560 to sensor platform component 540 to improve its reliability.

Figure 6:
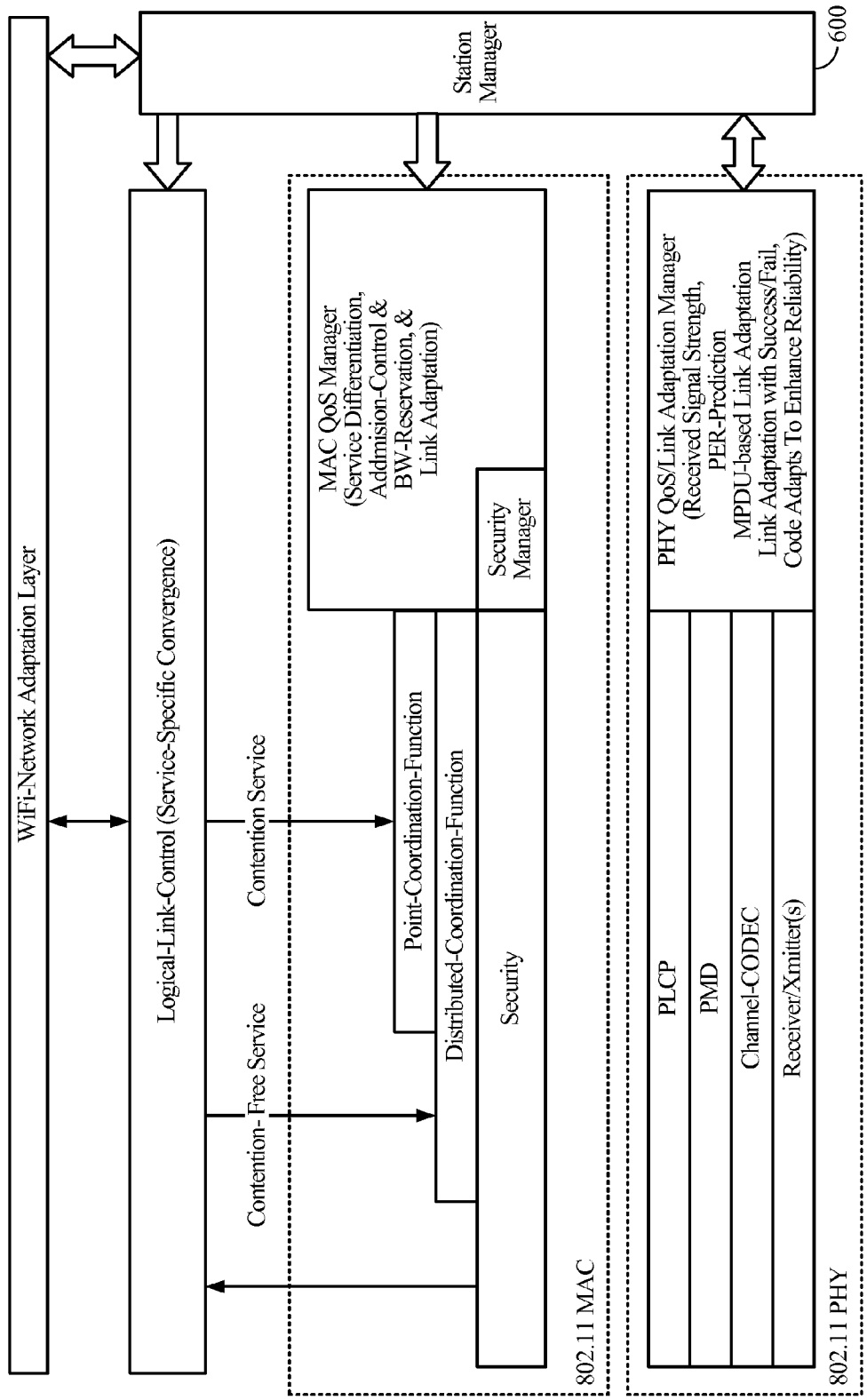
FIG. 6 depicts an exemplary layer diagram of a station manager.

FIG. 6 depicts a block diagram of a station manager that controls the wake and sleep modes of a WiFi radio component. As shown in FIG. 6, a station manager component 600 that may be located in a mobile terminal, docking station, or standalone sensor platform controls the connection components such as WiFi radio of the device in which the manager component 600 resides. For a station manager component 600 integrated into a mobile terminal, the station manager component controls the sleep and awake state of the terminal and its WiFi radio. For example, the station manager component may send wake and sleep commands to the WiFi radio at periodic intervals.

During operation, the station manager may send a sleep command to the WiFi radio so that the radio is not active and thus conserves the battery of the mobile terminal. In periodic intervals, the station manager 600 may send a wake command to the WiFi radio so that the radio is active and listens for beacon messages from other WiFi enabled devices. The periodic intervals may coincide with a target beacon transmit time or a time in which the mobile terminal would expect another WiFi enabled device to send a beacon message. Once a beacon message is received, the mobile terminal may allow the WiFi radio to remain active until a beacon message is not received or not received for a set period of time such as a 1000 milliseconds. If the station manager does not receive a beacon message or data for a specified interval, the station manager may send a sleep command to the WiFi radio to conserve batter power. Alternatively, if the station manager receives a stay awake command, the station manager may allow the WiFi radio to radio to remain active indefinitely until a release command is received from the source that sent the stay awake request (or another WiFi enabled device).

The station manager also may include a number of other functions. For example:

Scanning—Passive-Scanning (by listening for Beacon frames without transmitting); Active-Scanning (sending Probe-REQ frames on each channel and receiving Probe-RES); Listen/Search; Device-Discovery; Service-Discovery; Invitation Request/Response; and Group-Formation (Standard, Autonomous, and Persistent).

Association/Reassociation/Disassociation—Association is invoked the first time a station enters a network; Reassociation is requested when information from previous association is included; Join/Connect and Roam; Infrastructure or Ad-Hoc networks; and Peer-to-Peer/P2P or WiFi-Direct.

Time Synchronization—AP/GO regularly transmits Beacons to enable other stations to receive timestamps to maintain an isochronous local timer.

Coordination Function—for Contention Resolution and Avoidance; DCF/PCF/HCF, Backoff Coordination, and Slot Scheduling.

Service Management—Aggregation, Service Differentiation, Admission-Control and BW-Reservation, and Link Adaptation.

Security Management (WPS).

Power Management—requires SLEEP and causes absence disrupting AP/GO and station communication. However, this adds latency in the datapath between a WiFi-Dock sensor platform and a host station.

The station may also include a number of power saving functions. For example:

Constantly-Awake-Mode—to avoid hindering a node throughput, in CAM all of its power-saving features are disabled.

Wake-on-WiFi—like wake-on-LAN, allows the infrastructure to initiate WakeUP of stations in DOZE.

Power-Save-Mode—allows a node to DOZE after a variable but pre-determined period of inactivity, WakeUP regularly to LISTEN and reconnect.

Unscheduled-Automatic-Power-Save-Delivery (U-APSD)—may require an AP operating in CAM queue traffic for station in SLEEP and upon WakeUP, station can asynchronously request the queued traffic.

WMM Power-Save-Mode (WMM-PSM)—AP buffers all unicast, broadcast and multicast traffics, station informs AP of its SLEEP and upon station WakeUP during TBTT, AP uses flags in TIM to inform station of its queued unicast traffic, AP sends queued unicast traffic for station during its WakeUP or when station requests with PS-Poll, AP sets a special flag in TIM to signal DTIM when sending broadcast/multicast traffic.

Synchronous-Automatic-Power-Save-Delivery (S-APSD)—is the scheduled/synchronous version of WMM-PSM.

Power-Save-Multi-Poll—is an extension to U-APSD and S-APSD that reserves a time slot for a MIMO-STA, thus temporarily silences others associated with the station.

Dynamic-MIMO-Power-Save—this technique allows MIMO PHY to scale-down to less-aggressive/low-power configurations.

WiFi-Direct Opportunistic-Power-Save—OPS allows P2P-GO SLEEP for a limited period (CTWindow) after every TBTT, when all P2P-Clients are expected not to transmit.

WiFi-Direct Notice-of-Absence—NoA requires P2P-GO advertise its SLEEP schedule to signal its associated P2P-Clients when not to transmit.

Figure 7:
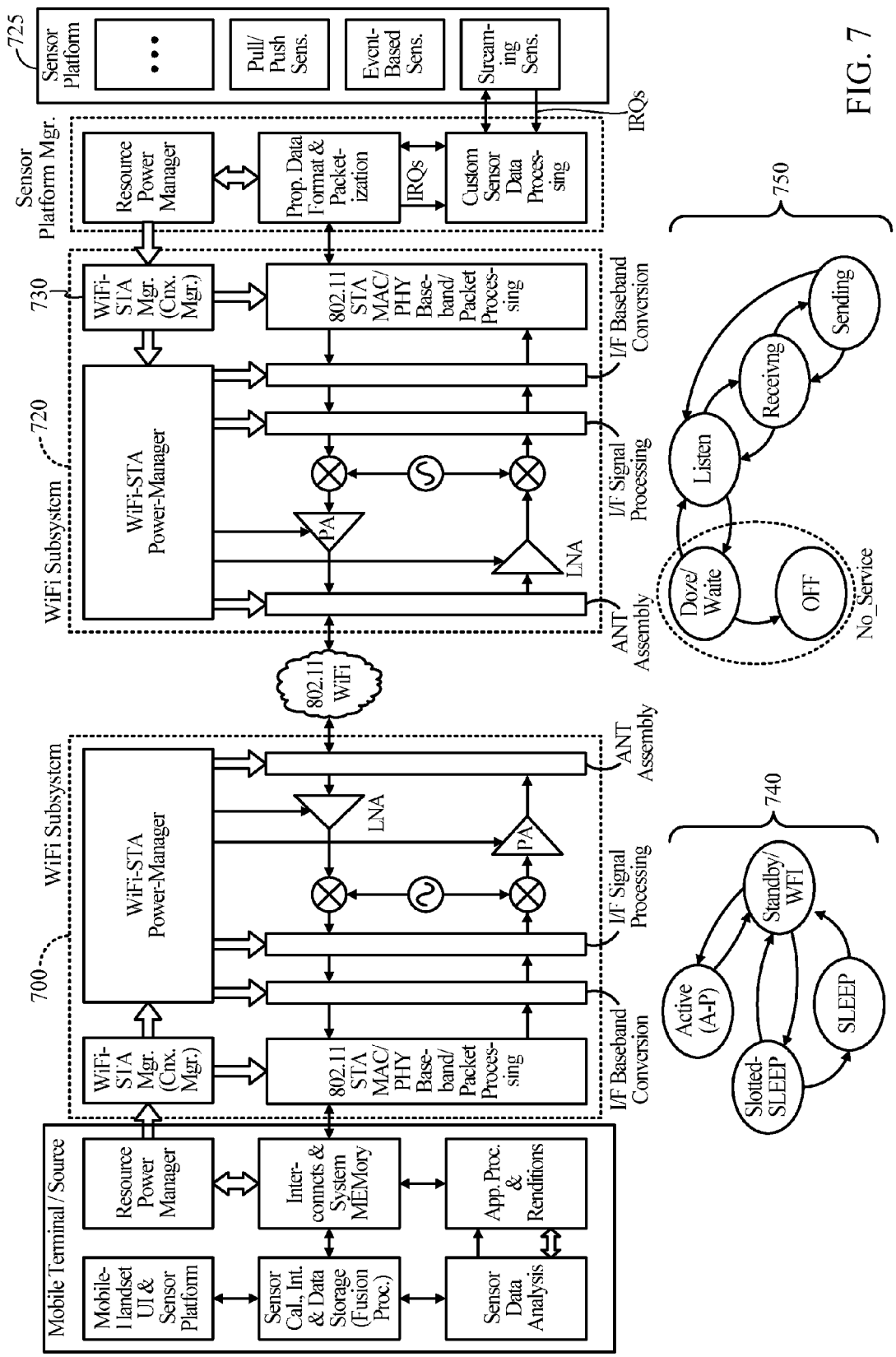
FIG. 7 depicts an exemplary block diagram of a mobile terminal and a sensor platform.

FIG. 7 depicts an exemplary mobile terminal connected to a docking station with a sensor platform. As shown in FIG. 7, a mobile terminal 700 may include a station manager component 710 that controls the antenna and radio subsystems or components. Also shown in FIG. 7, a docking station 720 may include a sensor platform 725 and a station manager component 730 that controls the antenna and radio subsystems or components of the docking station 720. Also shown in FIG. 7, the power states 740 for processing data in the mobile terminal may include an active state, standby state, slotted sleep state, and sleep state. The power states 750 for the WiFi subsystem may include inactive states off and doze/wait as well as active states listen, receiving, and sending.

Figure 8:
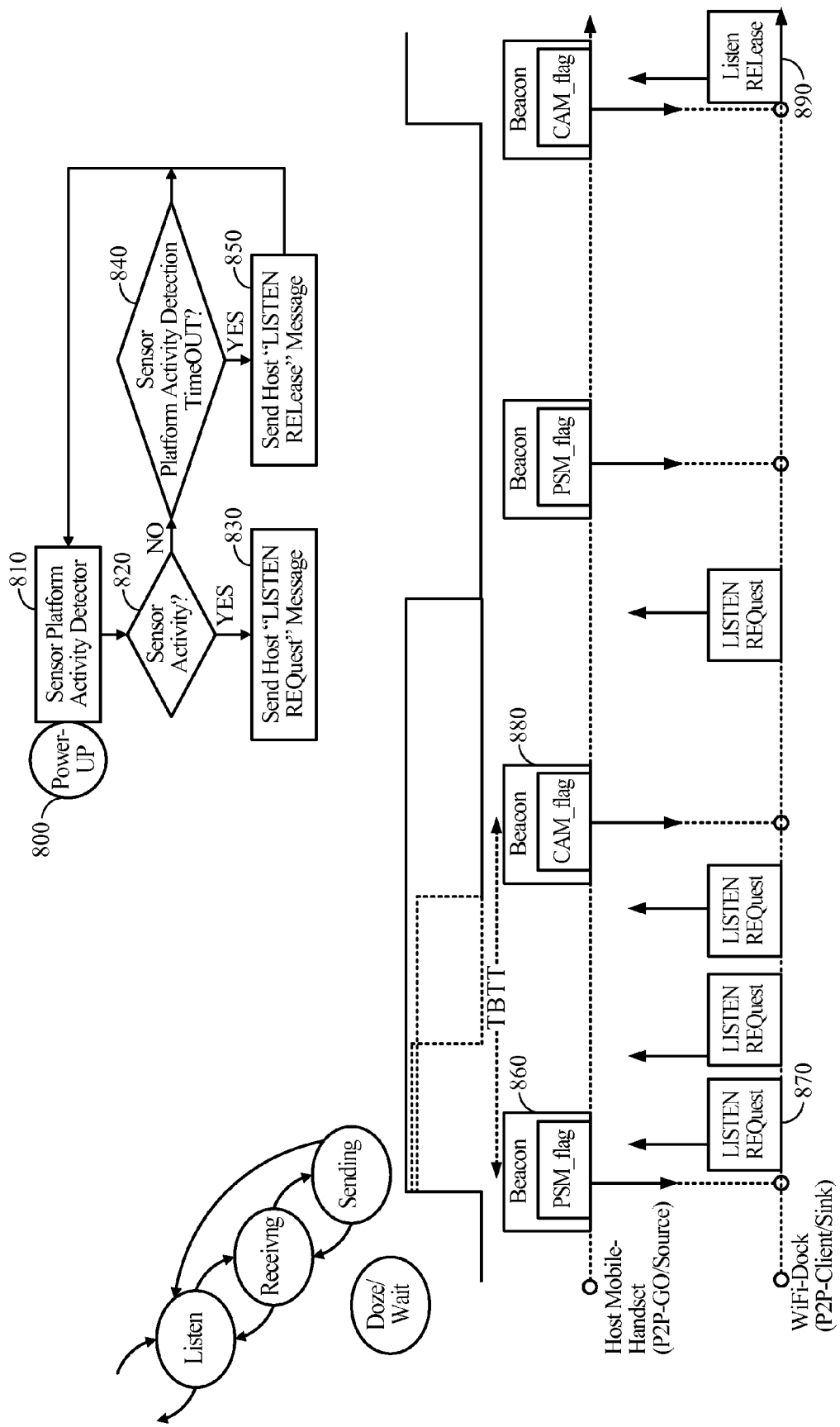
FIG. 8 depicts an exemplary flow chart of a sensor platform operation.

FIG. 8 depicts an exemplary flow chart of a sensor platform operation according to some embodiments of the disclosure. As shown in FIG. 8, a sensor platform initially powers up 800. The power up 800 activates a sensor platform activity detector 810 for detecting sensor activity. Next, the sensor platform activity detector determines if sensor activity is detected 820. If activity is detected, the sensor platform sends the host or mobile terminal a listen request message 830. If no sensor activity is detected, the sensor platform determines if a detection timeout period has been reached before any activity was detected 840. If no activity has been detected during the detection timeout period, the sensor platform sends the host or mobile terminal a listen release message 850. If the detection timeout period has not been exceeded, the sensor platform returns to the step of determining if any sensor activity is detected 820.

FIG. 8 also shows a timing diagram for the listen request and release between the mobile terminal/host and the WiFi dock/sensor platform. As can be seen, the mobile terminal is in a doze/wait inactive state (the WiFi radio is not turned on) until target beacon transmit time (TBTT). Once the next TBTT arrives, the mobile terminal may broadcast a beacon message with a power saving mode (PSM) flag 860. If the WiFi dock/sensor platform has detected sensor activity before this TBTT, the dock may send send a listen request message 870 to the mobile terminal or host. This listen request message 870 may be periodically sent to the mobile terminal or host during the TBTT window until an acknowledgement is received or another indication that the listen request message was received. For example, the mobile terminal or host may change its beacon message to remove the PSM flag and insert a CAM flag 880. This may be done in addition to or as a replacement for a listen request acknowledgement. Once the dock or sensor platform no longer detects sensor activity, the dock or sensor platform may release the mobile terminal or host by sending a listen release message 890 periodically during the next TBTT after no sensor activity is detected for a certain detection timeout period. Upon receiving a listen release message 890, the mobile terminal or host may change its beacon message from CAM to PSM and may optionally send a listen release acknowledgement to the dock or sensor platform.

In some embodiments of the disclosure, a proxy-assisted power-management protocol for Always-ON sensor processing in an ad-hoc wireless network is provided. The protocol may include a protocol for a host power-manager to operate in CAM-ONLY mode and a protocol for host power-manager to resume PSM operation. The CAM-ONLY mode may include Sensor-Platform-Manager requests Host to operate in CAM; During next TBTT, WiFi-Dock sends Host "LISTEN-REQ"; Host ACKs "LISTEN-REQ"; Host configures its power-manager to only function in CAM; and Host sets "CAM-ONLY" flag in ALL future Beacon messages.

The protocol for host power-manager to resume PSM operation may include Sensor-Platform-Manager cancels requests for Host to operate in CAM; WiFi-Dock sends Host "LISTEN-REL"; Host ACKs "LISTEN-REL"; Host sets "PSM" flag in next Beacon messages; and at next TBTT, host configures its power-manager for PSM operation. By using the proposed protocols, a Sensor-Platform-Manager in a WiFi-Dock may assist a Host WiFi power-manager to minimize its operation in CAM for remote sensor processing.

The LISTEN-REQ message may signal a receiving station to prepare and optimize its RX datapath for priority services (thus increasing QoS). The LISTEN-REQ message may also informs a receiving station that a sending statopm has optimized its RX datapath and is ready to LISTEN. By optimizing the RX datapath in a sender and receiver, transfer latency may be minimized and it allows raw-sensor data be transferred. This may create a reliable wireless raw-sensor transfer framework that lets sensors from multiple disparate devices be integrated by a single processing station to create a distributed sensor platform; Mobile-Handset, Wearable (On-Wrist, HMD, In-Clothing), WiFi-Dock, etc. This, in turn, enhances modularity/scalability, ensures platform upgradability and extendibility by specializing/optimizing sensor data for Use-Case/Applications (Touch/Tactile, Security/User-ID, CV, etc.), increases sensing performance (QoS/QoE) and optimizes power by scaling resources according to computational complexity, and minimizes Time-To-Obsolescence and cost of sending device.

Embodiments of the methods, apparatus, and systems described herein can be used in a number of applications. For example, the described embodiments could be used with a mobile terminal wirelessly docked with a docking station, a mobile terminal wirelessly connected to another mobile terminal, and a mobile terminal wirelessly connected to a sensor platform. Further applications should be readily apparent to those of ordinary skill in the art.

Nothing stated or illustrated depicted in this application is intended to dedicate any component, step, feature, object, benefit, advantage, or equivalent to the public, regardless of whether the component, step, feature, object, benefit, advantage, or the equivalent is recited in the claims.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some exemplary embodiments, some or a plurality of the most important method steps can be performed by such an apparatus.

The exemplary embodiments described above merely constitute an illustration of the principles of the present disclosure. It goes without saying that modifications and variations of the arrangements and details described herein will become apparent to other persons skilled in the art. Therefore, it is intended that the disclosure be restricted only by the scope of protection of the appended patent claims, rather than by the specific details presented on the basis of the description and the explanation of the exemplary embodiments herein.

In the detailed description above it can be seen that different features are grouped together in exemplary embodiments. This manner of disclosure should not be understood as an intention that the claimed exemplary embodiments require more features than are explicitly mentioned in the respective claim. Rather, the situation is such that inventive content may reside in fewer than all features of an individual exemplary embodiment disclosed. Therefore, the following claims should hereby be deemed to be incorporated in the description, wherein each claim by itself can stand as a separate exemplary embodiment. Although each claim by itself can stand as a separate exemplary embodiment, it should be noted that—although a dependent claim can refer in the claims to a specific combination with one or a plurality of claims—other exemplary embodiments can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some exemplary embodiments, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for remote power management, the method comprising:
   receiving, by a second wireless device, an awake request message from a first wireless device while the second wireless device is in a second awake mode with no active connection;
   configuring, by the second wireless device, the second wireless device to operate in a first awake mode during a transmit time and not return to the second awake mode until a release message is received based upon the awake request message;
   setting, by the second wireless device, an awake mode indicator in a beacon message of the second wireless device to a first status based upon the awake request message;
   sending, by the second wireless device, the beacon message during the transmit time;
   receiving, by the second wireless device, sensor data from the first wireless device;
   generating, by the second wireless device, calibration data based on the received sensor data; and
   sending, by the second wireless device, the calibration data to the first wireless device.

2. The method of claim 1, further comprising:
   optimizing a receive datapath of the second wireless device in response to the awake request message;
   optimizing a receive datapath of the first wireless device in response to the awake request message; and
   transmitting an awake acknowledgement message from the second wireless device to the first wireless device.

3. The method of claim 1, further comprising:
   receiving a sleep request message from the first wireless device;
   transmitting a sleep acknowledgement message from the second wireless device to the first wireless device;
   configuring the second wireless device to operate in the second awake mode during the transmit time based on the sleep request message; and
   setting the awake mode indicator in the beacon message to a second status based on the sleep request message, the second status being different than the first status.

4. The method of claim 1, further comprising configuring the second wireless device to prioritize data received from the first wireless device.

5. The method of claim 1, further comprising displaying data on the second wireless device upon entering the first awake mode.

6. The method of claim 1, wherein the first awake mode is a constant awake mode that keeps the second wireless device in a constant active power state.

7. The method of claim 1, further comprising:
   receiving a release message from the first wireless device;
   configuring the second wireless device to operate in the second awake mode based on the release message.

8. The method of claim 6, wherein the constant active power state disables power saving functions of the second wireless device.

9. The method of claim 7, further comprising transmitting a release acknowledgement message from the second wireless device to the first wireless device.

10. A host, comprising:
    a power management module for controlling a power state of the host; and
    a transmit-receive module connected to the power management module and configured to receive messages and transmit messages,
    wherein the power management module controls the power state of the host based on the received messages and the power management module is configurable to:
    receive, by the host, an awake request message from a wireless device platform while the host is in a second awake mode with no active connection;
    configure, by the host, the host to operate in a first awake mode during a transmit time and not return to the second awake mode until a release message is received based upon the awake request message;
    set, by the host, an awake mode indicator in a beacon message of the host to a first status based upon the awake request message;
    send, by the host, the beacon message during the transmit time;
    receive, by the host, sensor data from the wireless device platform;
    generate, by the host, calibration data based on the received sensor data; and
    send, by the host, the calibration data to the wireless device platform.

11. The host of claim 10, wherein the power management module is further configured to optimize the transmit-receive module of the host in response to the awake request message; and wherein the transmit-receive module transmits an indicator of a current power state of the host during a scheduled transmit time.

12. The host of claim 10, wherein the power management module switches the power state of the host to the constant awake mode upon receiving a listen message from the wireless device platform, activates the transmit-receive module, and controls the transmit-receive module to transmit an acknowledgement of the listen message to the wireless device platform.

13. The host of claim 12, further comprising a sensor module configured to analyze and calibrate the sensor data.

14. The host of claim 13, wherein the sensor module analyzes the sensor data received from the wireless device platform.

15. The host of claim 14, wherein the sensor module generates the sensor calibration data based on the analyzed sensor data and the transmit-receive module transmits the sensor calibration data to the wireless device platform.

16. A wireless docking station, comprising:
a sensor for sensing activity;
a transmit-receive module connected to the sensor and configured to receive and transmit messages and sensor data; and
a power management module connected to the transmit-receive module and configured to:
generate, by the wireless docking station, power management messages;
transmit, by the wireless docking station, an awake request message to a host while the host is in a second awake mode with no active connection;
wherein the awake request message indicates that the host should operate in a first awake mode during a transmit time and not return to the second awake mode until a release message is received, set an awake mode indicator in a beacon message of the host to a first status based upon the awake request message, send the beacon message during the transmit time.

17. The wireless docking station of claim 16, wherein the power management module is further configured to optimize the transmit-receive module of the wireless docking station in response to the awake request message; wherein the awake request message indicates that the host should optimize the transmit-receive module of the host in response to the awake request message; and wherein the transmit-receive module transmits a power management message during a scheduled transmit time after sensing activity by the sensor.

18. The wireless docking station of claim 17, wherein the transmit-receive module transmits sensor data about the sensed activity to the host.

19. The wireless docking station of claim 18, wherein the transmit-receive module receives sensor calibration data from the host.

20. The wireless docking station of claim 19, wherein the sensor calibrates the sensor based on the received sensor calibration data.

21. A power management device for remote power management, comprising:
means for receiving an awake request message, located in a second wireless device, from a first wireless device while the second wireless device is in a second awake mode with no active connection;
means for configuring, upon receiving the awake request message, located in the second wireless device, the second wireless device to operate in a first awake mode during a transmit time and not return to the second awake mode until a release message is received based upon the awake message request;
means for setting an awake mode indicator, located in the second wireless device, in a beacon message of the second wireless device to a first status based upon the awake message request;
means for sending the beacon message, located in the second wireless device, during the transmit time;
means for receiving sensor data, located in the second wireless device, from the first wireless device;
means for generating, by the second wireless device, calibration data based on the received sensor data; and
means for sending the calibration data, located in the second wireless device, to the first wireless device.

22. The power management device of claim 21, further comprising:

means for optimizing a receive datapath of the second wireless device in response to the awake request message;
means for optimizing a receive datapath of the first wireless device in response to the awake request message; and
means for transmitting an awake acknowledgement message from the second wireless device to the first wireless device.

23. The power management device of claim 21, further comprising:
means for receiving a sleep request message from the first wireless device;
means for transmitting a sleep acknowledgement message from the second wireless device to the first wireless device;
means for configuring the second wireless device to operate in the second awake mode during the transmit time based on the sleep request message; and
means for setting the awake mode indicator in the beacon message to a second status based on the sleep request message, the second status being different than the first status.

24. The power management device of claim 21, further comprising means for configuring the second wireless device to prioritize data received from the first wireless device.

25. The power management device of claim 21, further comprising means for displaying data on the second wireless device upon entering the first awake mode.

26. The power management device of claim 21, wherein the first awake mode is a constant awake mode that keeps the second wireless device in a constant active power state.

27. The power management device of claim 21, further comprising:
means for receiving a release message from the first wireless device;
means for configuring the second wireless device to operate in the second awake mode based on the release message.

28. The power management device of claim 26, wherein the constant active power state disables power saving functions of the second wireless device.

29. The power management device of claim 27, further comprising means for transmitting a release acknowledgement message from the second wireless device to the first wireless device.

30. A non-transitory computer readable medium having a computer readable program code embodied therein, said computer readable program code adapted to implement a method for remote power management, the method comprising:
receiving, by a second wireless device, an awake request message from a first wireless device while the second wireless device is in a second awake mode with no active connection;
configuring, by the second wireless device, the second wireless device to operate in a first awake mode during a transmit time and not return to the second awake mode until a release message is received based upon the awake request message;
setting, by the second wireless device, an awake mode indicator in a beacon message of the second wireless device to a first status based upon the awake request message;
sending, by the second wireless device, the beacon message during the transmit time;

receiving, by the second wireless device, sensor data from the first wireless device;

generating, by the second wireless device, calibration data based on the received sensor data; and sending, by the second wireless device, the calibration data to the first wireless device.

31. The non-transitory computer readable medium of claim 30, further comprising: optimizing a receive datapath of the second wireless device in response to the awake request message; optimizing a receive datapath of the first wireless device in response to the awake request message; and transmitting an awake acknowledgement message from the second wireless device to the first wireless device.

32. The non-transitory computer readable medium of claim 30, further comprising:

receiving a sleep request message from the first wireless device;

transmitting a sleep acknowledgement message from the second wireless device to the first wireless device;

configuring the second wireless device to operate in the second awake mode during the transmit time based on the sleep request message; and setting the awake mode indicator in the beacon message to a second status based on the sleep request message, the second status being different than the first status.

33. The non-transitory computer readable medium of claim 30, further comprising configuring the second wireless device to prioritize data received from the first wireless device.

34. The non-transitory computer readable medium of claim 30, further comprising displaying data on the second wireless device upon entering the first awake mode.

35. The non-transitory computer readable medium of claim 30, wherein the first awake mode is a constant awake mode that keeps the second wireless device in a constant active power state.

36. The non-transitory computer readable medium of claim 30, further comprising:

receiving a release message from the first wireless device;

configuring the second wireless device to operate in the second awake mode based on the release message.

37. The non-transitory computer readable medium of claim 35, wherein the constant active power state disables power saving functions of the second wireless device.

38. The non-transitory computer readable medium of claim 36, further comprising transmitting a release acknowledgement message from the second wireless device to the first wireless device.

* * * * *